May 10, 1932. J. A. PARENT 1,857,212
POTATO DIGGER
Filed Aug. 2, 1929 4 Sheets-Sheet 1
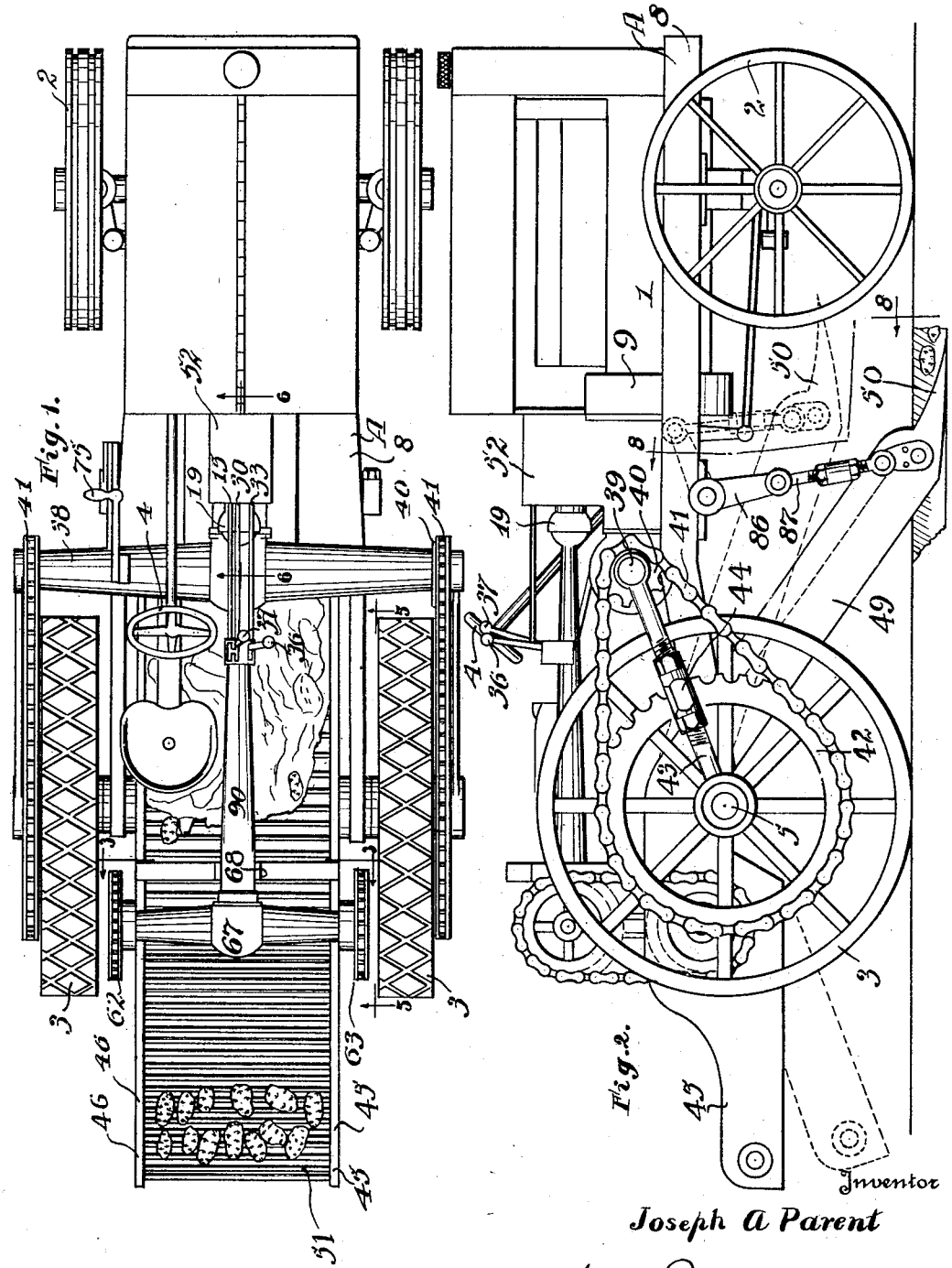
Inventor
Joseph A Parent
By H. S. Johnson
Attorney

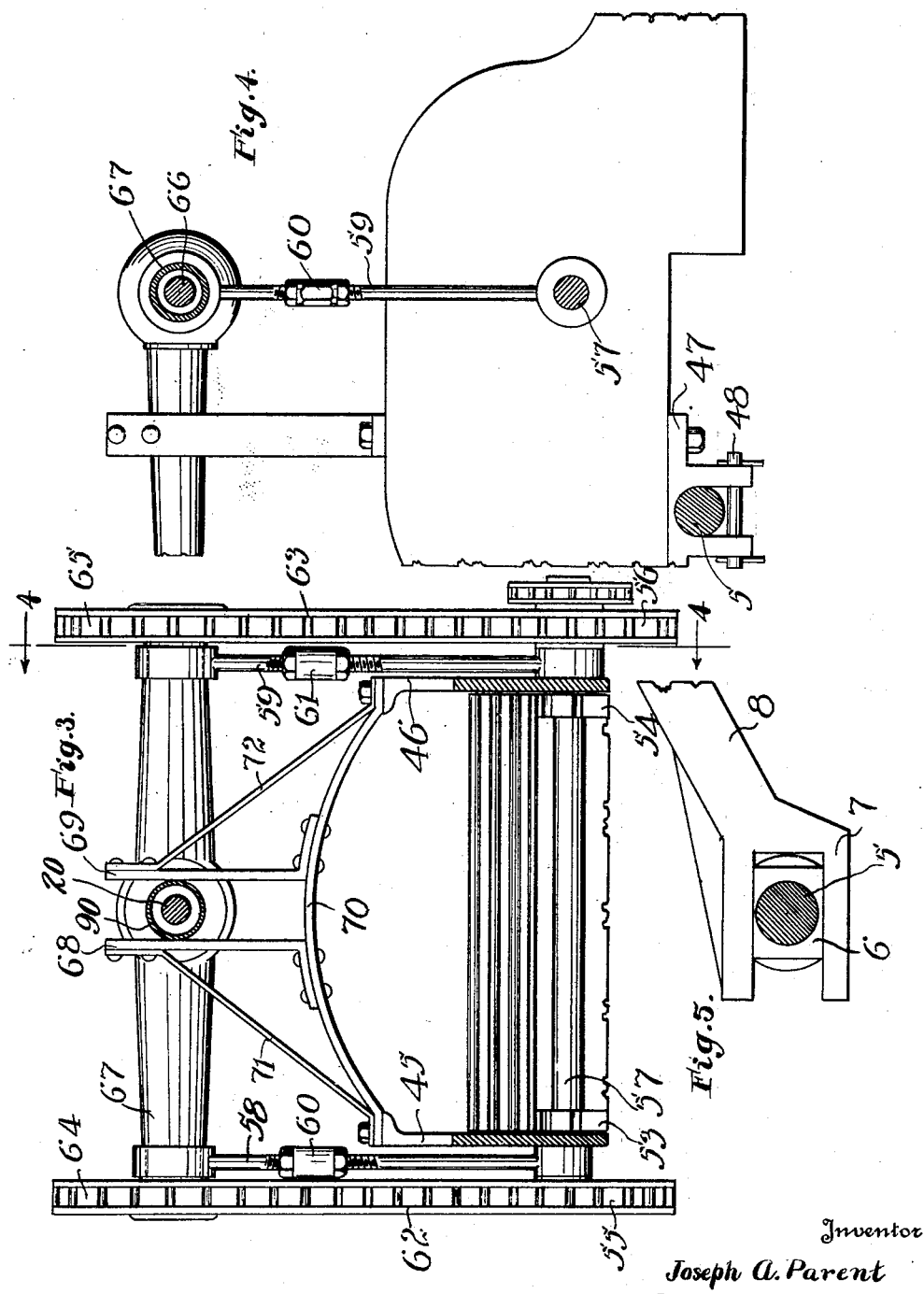

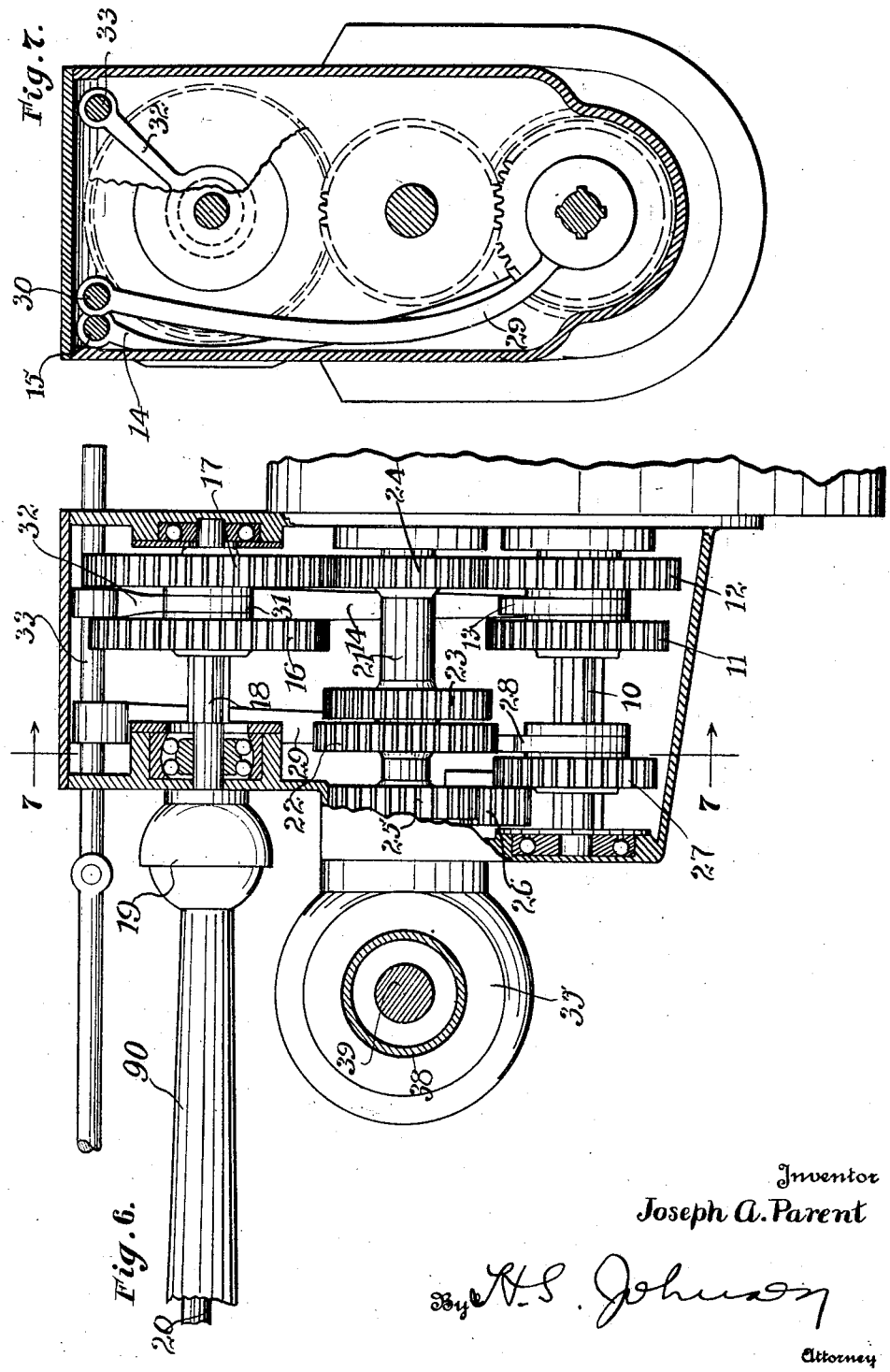

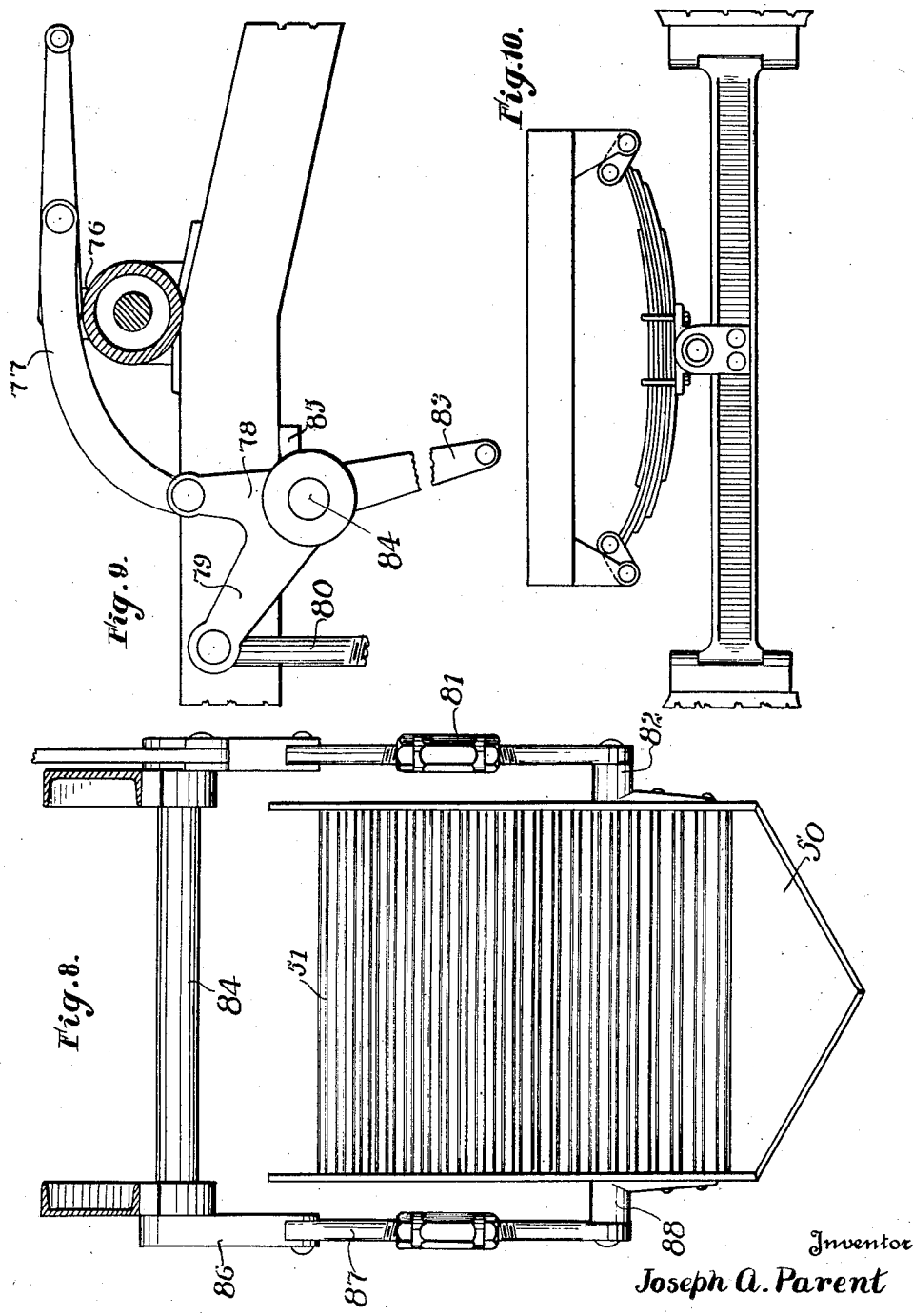

Patented May 10, 1932

1,857,212

UNITED STATES PATENT OFFICE

JOSEPH A. PARENT, OF EAST GRAND FORKS, MINNESOTA

POTATO DIGGER

Application filed August 2, 1929. Serial No. 383,031.

The present invention relates to a potato digging mechanism.

In an ordinary type of potato digging mechanism, said mechanism is drawn behind a tractor or other source of motive power, the wheels of the potato digging portion of the device being provided with cleats to enter and engage the surface of the ground over which the device is drawn, to provide motive power for the potato digging mechanism.

With such a device, when working in heavy soil or when the machine has a tendency to become clogged with weeds or the tops of the plants, and an extra load is thus placed on the drive mechanism the cleats may slide along the ground without operating the potato digging mechanism.

Furthermore, since such a device is drawn behind the source of motive power, the tractor or source of motive power must be turned in a wider circle than are the wheels of the potato digging mechanism. This being the case, in operating in a field which is enclosed by a fence or other obstacle which would prevent the passage of the tractor, it is sometimes necessary to start turning before the potato digging mechanism has reached the end of a row with the result that a few of the hills at the end of each row are missed.

An object of the present invention is to combine a potato digging mechanism with a tractive mechanism so that the potato digging mechanism is operated directly by the source of motive power for the tractive mechanism.

In order to attain this object, there is provided, in accordance with one feature of the invention, a wheeled, power driven, tractive mechanism with a frame removably mounted thereon, said frame having mounted thereon the necessary mechanism for the digging of potatoes and the freeing of such potatoes from the soil in which they are embedded. These and other features of the invention will be more fully brought out in the following description and the accompanying drawings, wherein:

Figure 1 is a plan view of my invention.

Figure 2 is a view in side elevation thereof.

Figure 3 is a sectional view on line 3—3 of Figure 1.

Figure 4 is a sectional view on line 4—4 of Figure 3.

Figure 5 is a sectional view on line 5—5 of Figure 1.

Figure 6 is a sectional view on line 6—6 of Figure 1.

Figure 7 is a sectional view on line 7—7 of Figure 6.

Figure 8 is a sectional view on line 8—8 of Figure 2.

Figure 9 shows in detail the lifting device in Figure 1; and

Figure 10 shows the front axle and mounting, as shown in Figures 1 and 2.

Referring to the drawings in detail the device comprises two major elements, namely, the tractor which supplies the motive power and support for the digging mechanism and the digging mechanism itself.

Referring first to the tractor a frame A has mounted thereon a driving motor, 1, with steerable forward wheels, 2, and rear driving wheels, 3. Steering of the device is accomplished in the customary manner, by means of a steering wheel, 4, which is connected by means of suitable intermediate mechanism to the forward wheels, 2.

This steering mechanism is of a well known type and it is therefore believed to be unnecessary to describe said mechanism in detail. The rear drive wheels, 3, are mounted to rotate freely upon an axle, 5, which is mounted on sliding blocks, 6, in the forked ends, 7, of the side frame members, 8, of the tractor. This construction is employed to permit longitudinal movement of the axle, 5, and drive wheels, 3, to adjust the tautness of a drive chain to be later described.

Connected to the rear of the motor, 1, is a clutch housing, 9, having a conventional type of clutch not shown, mounted therein. A gear box or transmission housing, 52, shown in detail in Figures 6 and 7, is connected to the rear of said clutch housing. In this transmission housing a splined shaft, 10, is driven directly from the motor, 1, through the clutch in the clutch housing, 9. Mounted upon this splined shaft, 10, is a pair of interconnected gears 11, and 12, which are connected as by means of a yoke, 13, and a shifting arm, 14, to a shifting rod, 15. A second pair of gears, 16 and 17, are slidably mounted upon a second splined shaft, 18, which shaft is connected through a universal joint, 19, and a drive shaft, 20, to the potato digging mechanism. These gears are provided with a yoke, 31, which is connected to a shifting arm, 32, which is in turn connected to a shifting rod, 33. An intermediate drive shaft, 21, is provided with gears, 22, 23, and 24, and a reverse gear, 25. A reverse idling gear, 26, is mounted to mesh with the reverse gear, 25. A gear, 27, is slidably mounted upon the lower splined shaft, 10, to be driven thereby and is connected by means of a yoke, 28, and a shifting arm, 29, to a shifting rod, 30. The intermediate drive shaft, 21, is connected by a suitable bevel gear to a differential enclosed in a housing, 35, which in connection with mechanism to be later described propels the drive wheels of the tractor. The shifting of the above described gears is accomplished by means of levers, 36 and 37 in a well known manner.

The driving speeds of the tractor may be termed high, intermediate, low and reverse. For high speed the gears, 12 and 24, are moved into meshed engagement with each other as shown in Figure 6, and the gear, 27, is moved out of engagement with both the reverse idling gear, 26, and the gear, 22.

For intermediate speed, the yoke, 13, is employed to shift gears, 11 and 12, to remove the gear, 12, from meshed engagement with the gear, 24, and to move the gear, 11, into meshed engagement with the gear, 23. The gear, 27, in intermediate speed remains out of meshed engagement with both the reverse idling gear, 26, and the gear, 22, as in high gear.

For low speed the gears, 11 and 12, are moved to occupy a position between the gears, 23, and 24, so as to be out of meshed engagement with both of said gears, and the gear, 27, is moved upon the splined shaft by means of the yoke, 28, so as to have meshed engagement with the gear, 22. For reversing the direction of drive, to back the tractor, the gear, 27, is moved into meshed engagement with the reverse idling gear, 26, which is in turn in continuous meshed engagement with the gear, 25.

To vary the speed of the potato digging drive shaft, 18, with respect to the intermediate shaft, 21, the gears, 16 and 17, may be slidably moved to have meshed engagement respectively with either the gear, 23, or the gear, 24, upon the intermediate drive shaft, 21. This speed adjustment of the upper shaft, 18, is merely variable with respect to the speed of the intermediate drive shaft, 21, the speed of which in turn, is controlled by the position of the gears on the splined shaft, 10, as previously described.

Projecting laterally from each side of the differential enclosed in the housing, 35, and enclosed by a housing, 38, are two shafts, 39, each of which is provided on its outer end with a drive sprocket, 40. From the drive sprocket, a drive chain, 41, passes around a large driven sprocket, 42, connected to the outer side of each of the rear driving wheels, 3. A thrust rod, 43, having a threaded adjustment, 44, therein is connected between the rear axle, 5, and the drive shaft, 39. These thrust rods resist the pull of the drive chains, 41, and also permit adjustment of the tautness of the drive chains.

The potato digging mechanism comprises a frame having two side frame members, 45 and 46. This frame is supported upon the rear axle, 5, of the tractor mechanism, each side frame member being provided with a bracket, 47, (see Figure 4) which fits over the axle and is provided with a transverse pin, 48, to hold the frame firmly in position thereon. The potato digging mechanism comprises a forwardly and downwardly extending portion, 49, having a pointed spade like forward end member, 50, which enters the ground to a predetermined depth and raises the potates and the soil in which they are embedded onto a slatted or apertured belt, 51, in accordance with the common practice in potato digging mechanism. This belt is kept in a state of constant agitation as by means of eccentric rollers in accordance with common practice in potato digging mechanisms, to free the potatoes from the dirt in which they are embedded and to cause the dirt to fall downwardly between the slats in the belt onto the ground; the potatoes themselves are carried the entire length of the belt and are dropped off the rear end of the belt onto the ground above the dirt in which they were formerly embedded.

The belt, 51, passes over a pair of notched wheels, 53, and 54, (best shown in Figure 3), which engage the slats of the belt to propel said belt in the desired direction. These notched wheels, 53, and 54, are mounted upon shaft, 57, to rotate therewith. Sprocket wheels, 55, and 56, are affixed to the outer end of the shaft, 57, and are keyed thereto. Thrust rods, 58, and 59, are also journaled on the shaft, 57, just inside the sprockets, 55 and 56. These thrust rods are provided with threaded adjustments, 60 and 61, to permit adjustment of the tautness of the drive chains, 62, and 63, which pass around the sprockets, 55, and 56, and over a second pair of sprockets, 64 and 65, which are mounted upon a transverse drive shaft, 66, (see Figure 4). The upper end of the thrust rods, 58 and 59, are firmly connected to a housing, 67, which encloses the drive shaft, 66. The drive shaft, 66, is driven by suitable gear mechanism, not shown, from the drive shaft, 20, which extends forwardly through the universal joint, 19, and into the transmission housing, 52. The drive shaft, 20, is enclosed in the housing, 90, which rides between two vertical members, 68 and 69, affixed to a transverse brace member, 70, which is firmly mounted across the upper portion of frame members, 45 and 46. Extending angularly upward from the ends of the transverse member, 70, are two brace members, 71 and 72, which firmly anchor the upright members, 68 and 69, against lateral displacement. This construction permits the drive shaft, 20, to be moved vertically with respect to the driven shaft, 57, to adjust the tautness of the drive chains, 62 and 63, and also permits the potato digging mechanism frame to be tilted in raising and lowering the forward end thereof.

The mounting of the potato digging frame mechanism as illustrated in Figure 4 leaves it free for pivotal movement upon the axle, 5, and permits the potato digging mechanism to be either tilted forward to the solid line position shown in Figure 2, or to be tilted back to the dotted line position illustrated therein. The tilting of the potato digging mechanism is accomplished by means of a hand lever, 75, which is mounted upon a bracket, 76, secured to the housing, 38. This tilting mechanism is best illustrated in Figures 8 and 9. The lever, 75, is mounted upon the bracket, 76, and is connected by means of a link, 77, to a bell crank lever, 78. A second arm, 79, of this bell crank lever is pivotally connected to a rod, 80, which is provided with a threaded adjustment member, 81. The lower end of this rod, 80, is pivotally connected to a bracket 82, which is firmly secured to the outer side of the potato digging member near the forward ends thereof. A third downwardly extending arm, 83, of the bell crank lever is provided with a transverse pedal rod near the lower end thereof and is intended to be used as a foot pedal by the operator in raising the potato digging mechanism to the dotted line position illustrated in Figure 2. The bell crank lever, 78, is mounted on a rod, 84, to rotate therewith. This rod, 84, is journaled in bearings, 85, secured to the lower edges of the tractor frame members. To the opposite end of this rod, 84, is secured an arm, 86, which through an adjustable rod, 87, is connected by means of a bracket, 88, to the opposite side of the potato digging frame from the bracket, 82.

The frame tilting mechanism is shown in a forwardly tilted position in Figure 8, and in a rearwardly tilted position in Figure 9.

Since the spade like forward end of the potato digging mechanism is well forward of the rear wheels of the device it is possible to dig potatoes to a point very close to any obstructions which may be encountered at the end of a row. Also with the present potato digging mechanism it is very simple matter to back or turn the tractor, since with the potato digging mechanism in the raised position indicated in dotted lines in Figure 2, the four wheels of the tractor are the only portion of the device that are in contact with the ground. With the potato digging mechanism removed the tractor portion may be used as an ordinary farm tractor.

I claim:

1. In combination with a tractor having a driving motor mounted thereon, a tiltable frame mounted on said tractor the forward end of said tiltable frame being positioned forwardly of the rear wheels of said tractor and being pointed to enter the earth over which the tractor is passing, an apertured belt extending upwardly and rearwardly from said pointed forward portion to carry the earth raised by said pointed forward portion upwardly and rearwardly, a shaft having a universal joint therein connected to have driven connection with said motor and slidably mounted with respect to said tractor at its rear end to have a vertical movement with respect thereto, and gear means having driven connection with said shaft and having driving connection with said belt to carry earth deposited thereon by the pointed forward end of said tiltable frame upwardly and rearwardly.

2. In combination with a tractor having a driving motor thereon, a tiltable frame removably mounted on said tractor, the forward end of said frame being positioned forwardly of the rear wheels of said tractor and being pointed to enter the earth over which the tractor is passing, an apertured belt extending upwardly and rearwardly from said pointed forward portion, a shaft having a universal joint therein removably connected to have driven connection with said motor and slidably mounted with respect to said tractor, and drive means having driven connection with said shaft and having driving connection with said belt to carry earth deposited thereon by the pointed forward end of said tiltable frame upwardly and rearwardly.

In testimony whereof I affix my signature.

JOSEPH A. PARENT.